United States Patent [19]

Schaaf

[11] Patent Number: 5,427,249

[45] Date of Patent: Jun. 27, 1995

[54] FERROUS METAL SEPARATOR FOR USE WITH A SCREW EXTRUDER AND METHOD

[76] Inventor: William R. Schaaf, 210 Middle Brook Rd., Greer, S.C. 29651

[21] Appl. No.: 230,219

[22] Filed: Apr. 20, 1994

[51] Int. Cl.⁶ .............................................. B03C 1/26
[52] U.S. Cl. ................................. 209/223.2; 209/908
[58] Field of Search .................... 209/223.2, 231, 908, 209/910

[56] References Cited

U.S. PATENT DOCUMENTS

| | | | |
|---|---|---|---|
| 2,992,735 | 7/1961 | Troy | 209/223.2 X |
| 4,333,825 | 6/1982 | Wyland et al. | 209/231 X |
| 4,457,838 | 7/1984 | Carr | 209/223.2 |
| 4,867,869 | 9/1989 | Barrett | 209/223.2 |
| 5,190,159 | 3/1993 | Barker | 209/223.2 |

FOREIGN PATENT DOCUMENTS 3307319  9/1984  Germany ......................... 209/223.2

*Primary Examiner*—D. Glenn Dayoan
*Attorney, Agent, or Firm*—Ralph Bailey

[57] ABSTRACT

A ferrous metal separator for use with a screw extruder utilizes an assembly of bar magnets (A) carried by a frame member (B) for reception by horizontal plastic tubes (C) which are also secured in an assembly by a skimmer plate (D) and a base member (E) for receiving the magnets for positioning and removal as a unitary apparatus from a feeding passageway of a screw extruder for removing tramp metal.

3 Claims, 3 Drawing Sheets

FERROUS METAL SEPARATOR FOR USE WITH A SCREW EXTRUDER AND METHOD

BACKGROUND OF THE INVENTION

This invention relates to apparatus and method for removing tramp metal in the form of ferrous metal particles from the plastic material being fed from a hopper and through a feeding passageway to a screw extruder positioned therebeneath.

Many problems are brought about by tramp metal which consists primarily of ferrous metal particles fed along with plastic material as to the screw or ram screw of an extruder. The housing or barrel and the screw itself may become damaged by the grinding action induced by the tramp metal. This grinding action is the reason for severe wear upon the screw assembly including the housing with excessive wearing and breaking of the components of the screw extruder. Moreover, the quality of the extruded product may be impaired by the presence of tramp metal which passes through the process. The normal cycles of operation of a screw extruder are often interrupted in an attempt to remove tramp metal as well as to carry out routine cleaning by the insertion of a horizontal slide plate across the feeding passageway to temporarily interrupt the flow of plastic material from the hopper into the screw extruder. In customary operation the housing or barrel of the screw extruder is surrounded by spaced band heaters and the like for melting the plastic material to be pushed as by the combination of screw and ram or screw alone through a die or to a mold which configures the extrusion into a desired shape or cross section.

Efforts have been made to remove tramp metal and any other magnetic metal material flowing from a hopper through a feeding passageway such as is illustrated in U.S. Pat. No. 4,333,825. The difficulty of mounting a magnet of sufficient size to effectively remove the magnetic particles is accentuated by the difficulty of removing a non-metallic cover while the over sized magnet is retained within the passageway. U.S. Pat. No. 4,867,869 illustrates a grate magnet which extends across a feeding passageway utilizing bar magnets and a retaining tube assembly which are withdrawn from the feeding passageway sequentially in a horizontal plane but are not completely removed therefrom. This structure causes difficulty in removing the tramp metal from the grate magnet apparatus which is retained partially within the passageway or housing through which the flowing material containing tramp metal passes. The prior art is further illustrated by U.S. Pat. No. 5,043,063 and Fed. Rep. of Germany Pat. No. 3,307,319, 9/1984.

SUMMARY OF THE INVENTION

Accordingly, it is an important object of this invention to provide a simplified ferrous metal separator and method for use in removing tramp metal from plastic material being fed through a feeding passageway of a hopper into a screw extruder.

Another important object of the invention is to provide a ferrous metal separator and method wherein the ferrous metal separator contains a bar magnet assembly together with a plastic tube assembly for receiving the bar magnets, wherein both assemblies are completely removable as a unit from a feeding passageway for plastic material flowing into the housing of a screw extruder.

Another important object of the invention is the provision of a combination of bar magnets and tubes constructed of non-magnetic material comprising a unitary apparatus which may be readily positioned across a feeding passageway for plastic material flowing into a screw extruder. The non-magnetic tubes may be assembled between a skimmer plate and a base plate so that the skimmer plate will remove the metallic particles adhering to the outside of the tubes as the bar magnets are withdrawn. The magnets and the tubes are removable at the same time as a unitary separator assembly from the feeding passageway to facilitate removal of the magnetic metal collected from the flow of the plastic material from the separator assembly including the bar magnets and the plastic tubes at a location remote from the screw extruder.

Another important object of the invention is the provision of a unitary apparatus consisting of an assembly of tubes constructed of non-magnetic material, each tube having an open end for receiving an assembly of bar magnets in such a way as to provide fastening means for securing the assemblies together while excluding dust and metal particles from access to the bar magnets.

It has been found that an improved ferrous metal separator and method may be provided for use with a screw extruder to remove metallic particles from a flow of plastic material wherein spaced bar magnets, weighing less than a single large magnet while possessing a substantially larger surface area available for attracting particles, may be placed in plastic tubes which act as sheath members for receiving an assembly of bar magnets in such a way that the apparatus may be removed with the metallic particles collected thereon for separation, reassembly and reinsertion across the feeding passageway to the extruder. The assembly or bar magnets has a frame member bridging one end. The assembly of non-metallic tubular members carries a plate which acts as a base support on one end as well as a skimmer plate on an opposite end. The base plate reinforces one end, facilitates sliding of the entire apparatus into and across the feeding passageway of the extruder and adds rigidity and strength to the assembly.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a ferrous metal separator for use with a screw extruder having a horizontal screw, and a hopper thereover containing plastic pellets and ferrous metal particles which are fed by gravity through a feeding passageway to the screw. An opening is provided in the feeding passageway with supports for reception of the ferrous metal separator thereacross. A plurality of spaced substantially horizontal bar magnets A are received in the feeding passageway opposite the side opening extending across the feeding passageway. A frame member B extends across the horizontal bar magnets and is fastened to each bar magnet on one end, extending across the side opening in the feeding passageway, forming a unitary assembly of bar magnets. A plurality of spaced substantially horizontal plastic tubes C receive the bar magnets respectively across the feeding passageway. The plastic tubes are each closed on one end so as to cover a free end of the bar magnets. A skimmer plate D extends across the plastic tubes on the open ends thereof opposite the frame member B. The skimmer plate has spaced openings therein receiving the bar magnets and are fastened to the other ends of the tubes forming a unitary assembly of plastic tubes. A base member E extends across the plastic tubes adjacent the closed ends and is fastened thereto so as to provide rigidity and reinforcement to the plastic tubes. The assembly of plastic tubes and the assembly of bar magnets are removable as a unit from the feeding passageway. Thus, the assemblies may be moved to a location remote from the screw extruder for removal of the bar magnets from the tubes with consequent release of ferrous metal particles collected on the plastic tubes by the action of the skimmer plate as the magnets are removed from respective tubes.

Figure 1:
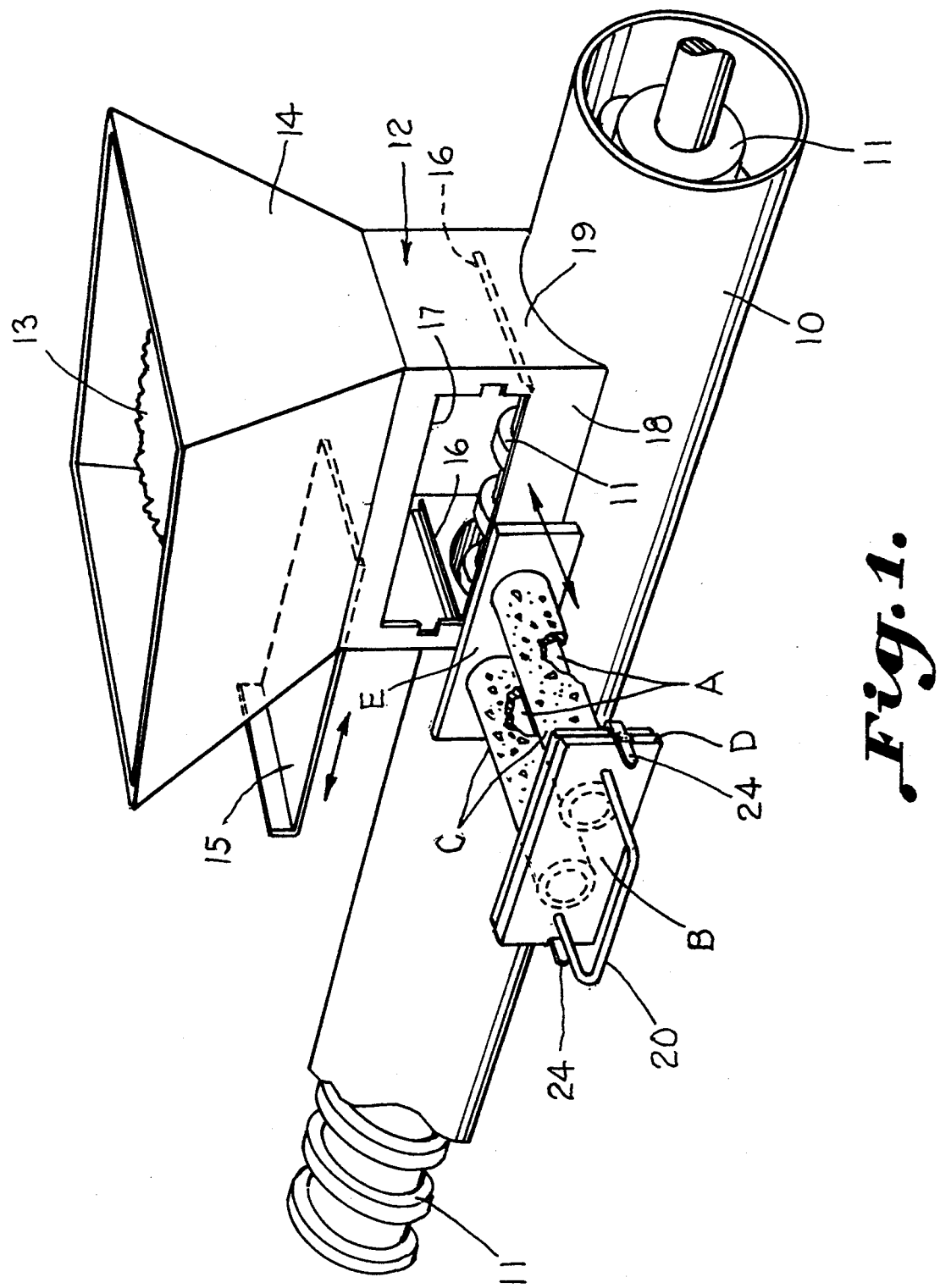
FIG. 1 is a perspective view illustrating the insertion and removal of a ferrous metal separator constructed in accordance with the invention across the feeding passageway of a hopper supplying plastic material in a screw extruder.
Figure 2:
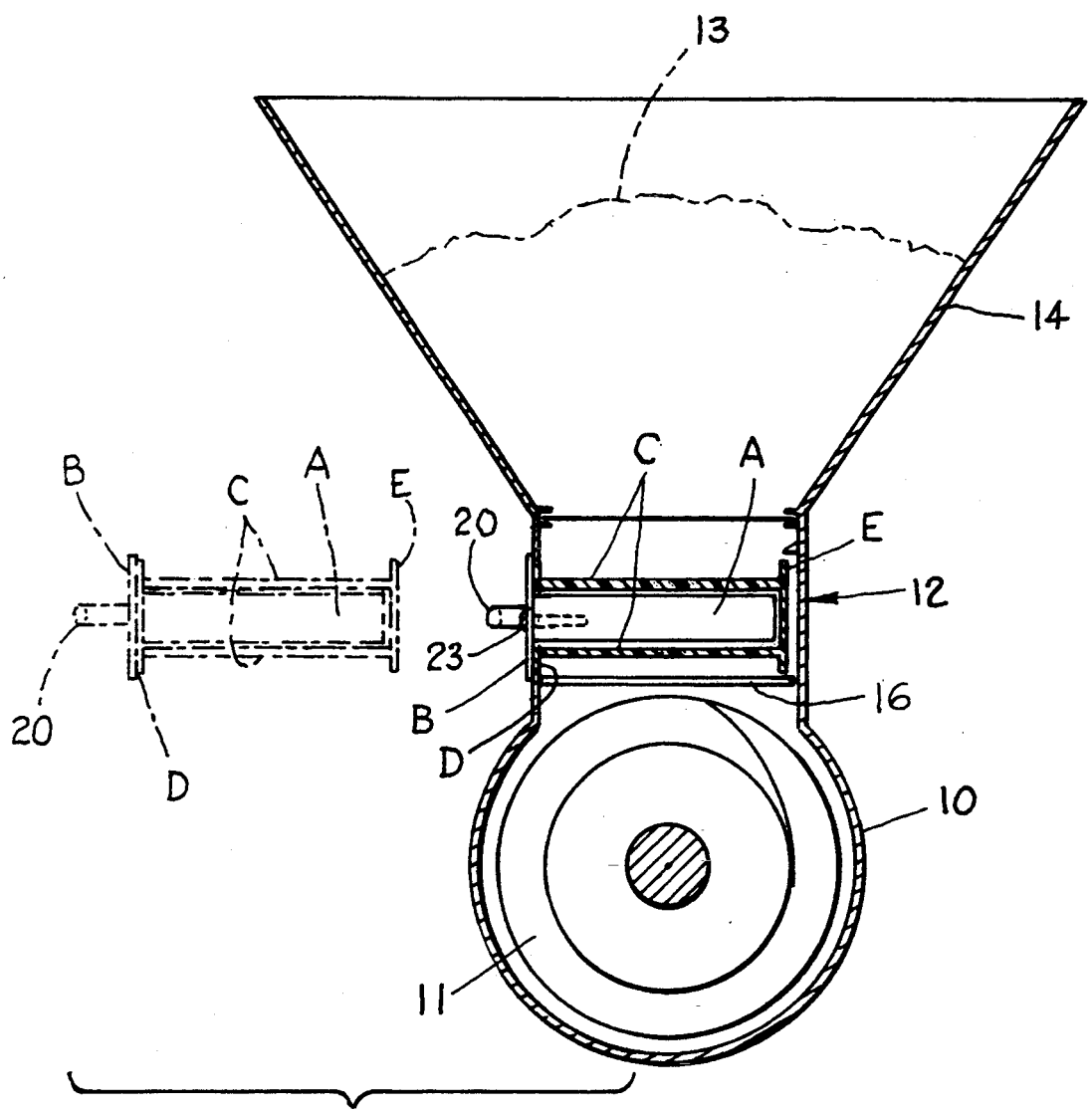
FIG. 2 is an enlarged front sectional elevation illustrating the apparatus of FIG. 1 in broken lines as having been removed from the extruder.
Figure 4:
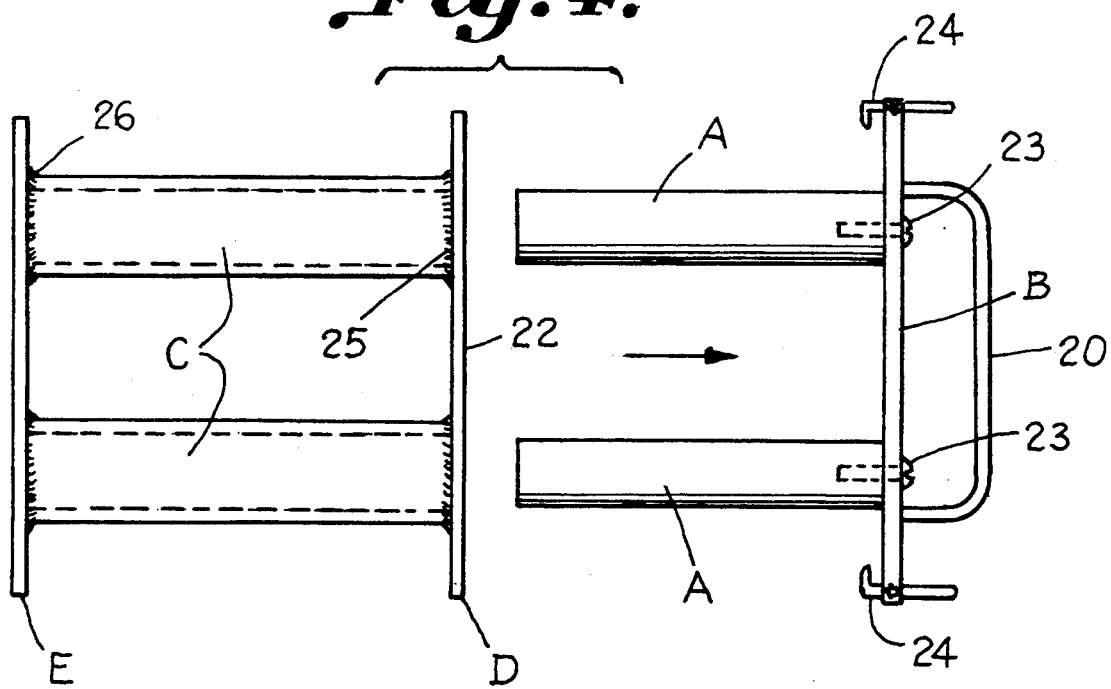
FIG. 4 is a plan view illustrating the apparatus of FIG. 3 with the assembly of bar magnets withdrawn from the assembly of tubular members.
Figure 3:
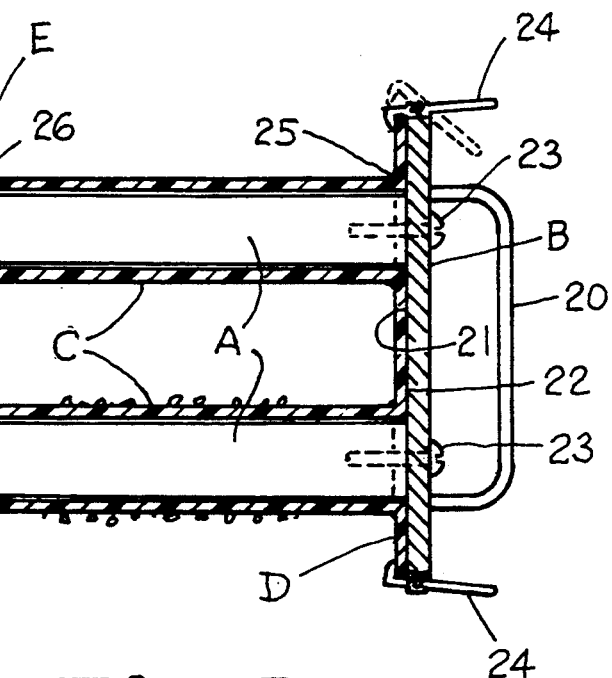
FIG. 3 is a sectional top plan view illustrating the apparatus consisting of the magnet and tube assemblies in assembled relation for insertion into and removal from a screw extruder.

Referring more particularly to FIGS. 1 and 2, a substantially horizontal housing 10 which carries a screw assembly 11 for heating and delivering plastic to a die (not shown) forms a continuous extruding section. The feeding passageway broadly designated at 12 is supplied with plastic material in the form of pellets and the like 13. The plastic material 13 flows from the hopper 14 through the feeding passageway 12 into the screw extruder. A horizontal cutoff plate 15 is illustrated in FIG. 1 as being slideably insertable across the passageway 12 when it is desired temporarily shutting off the flow of plastic material for cleaning plastic accumulations and particularly tramp metal from the extruder. The spaced substantially horizontal bar magnets A are illustrated in FIG. 1 as being assembled and encased within a plurality of horizontal plastic tubes C which are positioned across the feeding passageway 12 and supported on horizontal tracks 16. The apparatus, including the assembly of magnets and the assembly of tubes, is receivable as a unit into the side opening 17 formed within the vertical feeding passageway 12. The feeding passageway 12 is essentially formed from vertical front and back members 18 and side members 19.

The horizontal bar magnets A are bridged on one end by the frame member B which is illustrated as carrying a suitable handle 20 for removing the unitary apparatus from the extruder. The frame member B has a smooth inside sealing member 21 for receiving a complementary outer surface 22 of the skimmer plate D in sealing relation. It will be noted that the bar magnets A are secured by fasteners 23 to the frame members B.

Suitable clips including pivoted fastener members 24 are carried at each end of the frame member B for securement of the tubular assembly by means of the skimmer plate D in assembled relation for insertion into and removal from the feeding passageway 12.

It will be observed that the tubular assembly includes the spaced tubular members C preferably molded or extruded of suitable plastic non-magnetic material such as polyethylene, polypropylene and the like which may be suitably secured as by gluing at 25 to the skimmer plate D on one end at 26 to the base member E on the other end. It will be observed that by utilizing a plurality of magnets and complementary tubular members that the surface area for the magnetic particles to adhere to is greatly increased over that which would be afforded by a single bar magnet of equal weight. Thus, it is possible to readily manipulate the entire ferrous metal separator as a unit for removal entirely away from the screw extruder to facilitate ease in cleaning.

While a preferred embodiment of the invention has been described using specific terms, such description is for illustrative purposes only, and it is to be understood that changes and variations may be made without departing from the spirit or scope of the following claims.

What is claimed is:

1. A ferrous metal separator for use with a screw extruder having a horizontal screw, and a hopper thereover containing plastic pellets and ferrous metal particles which are fed by gravity through a feeding passageway to the screw wherein a side opening is provided for reception and support of said ferrous metal separator comprising:

a plurality of spaced substantially horizontal bar magnets received in said feeding passageway opposite said side opening extending across the feeding passageway;

a frame member extending across said horizontal bar magnets and being fastened to each of said bar magnets on one end across said side opening forming a unitary assembly of bar magnets;

a plurality of spaced substantially horizontal plastic tubes having apertures in one end for receiving said assembly of bar magnets;

said assembly of bar magnets being removable as a unit from said plastic tubes for separation of ferrous metal particles therefrom;

said plastic tubes each being closed on an opposite end adjacent free ends of said bar magnets;

a skimmer plate extending across said plastic tubes on said one end thereof adjacent said frame member;

said skimmer plate having spaced openings therein receiving said bar magnets and being fastened to said one end of each of said tubes forming a unitary assembly of plastic tubes;

a base member extending across said plastic tubes adjacent said closed ends and being fastened thereto so as to provide rigidity and reinforcement to said unitary assembly of plastic tubes;

a handle attached to an outer surface of said frame member so as to facilitate removability and portability of said assembly of plastic tubes and said assembly of bar magnets; and said assembly of plastic tubes and said assembly of bar magnets being removable as a unit from said feeding passageway of said screw extruder for manual transfer to a remote location;

whereby said assemblies may be moved from said screw extruder for removal of the bar magnets from the tubes with consequent release of ferrous metal collected on the plastic tubes by the action of the skimmer plate as the magnets are removed from respective tubes.

2. The structure set forth in claim 1 including fastener means, and sealing means securing said frame member to said skimmer plate avoiding entry of fine ferrous metal particles into the tubes and attaching themselves to the bar magnets.

3. The method of separating ferrous metal particles from plastic material being fed to a screw extruder having a horizontal screw, and a hopper thereover containing the plastic material and ferrous metal particles which are fed by gravity through a feeding passageway to the screw, said feeding passageway having a side opening for reception of a ferrous metal separator comprising:

positioning a plurality of spaced substantially horizontal bar magnets in said feeding passageway opposite said side opening extending across the feeding passageway;

connecting said horizontal bar magnets by a frame member fastened to each bar magnet on one end across said side opening forming a unitary assembly of bar magnets;

inserting said bar magnets into open ends of a plurality of spaced substantially horizontal plastic tubes receiving said bar magnets across said feeding passageway;

closing the other ends of the plastic tubes across free ends of the bar magnets;

providing a skimmer plate extending across said plastic tubes on said one end thereof adjacent said frame member, said skimmer plate receiving and permitting withdrawal of said bar magnets through openings therein;

fastening said skimmer plate to said one end of each of said tubes forming a unitary assembly of plastic tubes;

positioning a base member extending across said plastic tubes adjacent said closed ends and being fastened thereto so as to provide rigidity and reinforcement to said assembly of plastic tubes;

fastening means on an outer surface of said frame member so as to provide removability and portability of said assembly of plastic tubes and said assembly of bar magnets;

removing said assembly of plastic tubes and said assembly of bar magnets as a unit from said feeding passageway of said screw extruder to a remote location when a predetermined amount of ferrous metal particles have been collected on said tubes;

separating said assembly of bar magnets completely from said plastic tubes by withdrawing said bar magnets from said open ends of said plastic tubes, thereby removing said ferrous metal particles from the attraction of said magnets by the action of said skimmer plate and preventing further attachment thereto; and reinserting said bar magnets in said open ends of said plastic tubes;

whereby said assemblies may be manually removed as a unit to a separate screw extruder for reinsertion or readily cleaned of ferrous metal collected on the plastic tubes at a location entirely away from said screw extruder.

* * * * *